US012591602B2

(12) United States Patent
Ogden et al.

(10) Patent No.: US 12,591,602 B2
(45) Date of Patent: Mar. 31, 2026

(54) TRAINING MACHINE LEARNING BASED NATURAL LANGUAGE PROCESSING FOR SPECIALTY JARGON

(71) Applicant: Florida Power & Light Company, Juno Beach, FL (US)

(72) Inventors: Kevin Ogden, North Palm Beach, FL (US); Lissette Melendez, Palm Beach Gardens, FL (US); Fred Meyler, Palm Bay, FL (US); Camille Zerfas, Rockville, MD (US); Joseph Prusa, Boulder, CO (US); Yihong Ge, Palm Beach Gardens, FL (US); Mahdi Esfahanian, Plano, TX (US)

(73) Assignee: Florida Power & Light Company, Juno Beach, FL (US)

( * ) Notice: Subject to any disclaimer, the term of this patent is extended or adjusted under 35 U.S.C. 154(b) by 744 days.

(21) Appl. No.: 17/936,873

(22) Filed: Sep. 30, 2022

(65) Prior Publication Data

US 2024/0111795 A1     Apr. 4, 2024

(51) Int. Cl.
*G06F 16/3329* (2025.01)
*G06F 11/34* (2006.01)
(Continued)

(52) U.S. Cl.
CPC ...... *G06F 16/3329* (2019.01); *G06F 11/3409* (2013.01); *G06N 5/02* (2013.01);
(Continued)

(58) Field of Classification Search
CPC ... G06F 16/3329; G06F 11/3409; G06N 5/02; G06N 5/022; G06N 5/04; G06N 20/00
(Continued)

(56) References Cited

U.S. PATENT DOCUMENTS 7,555,425 B2 * 6/2009 Oon ........................ G06F 40/30
                                                                    705/2
7,814,127 B2 * 10/2010 Dettinger .......... G06F 16/90332
                                                                    707/810
(Continued)

FOREIGN PATENT DOCUMENTS

CN       115391527 A  * 11/2022  ........... G06F 16/332
DE   102022208083 A1 *  2/2024  ............... G06N 3/04
(Continued)

OTHER PUBLICATIONS

Lonsdale Reusing ontologies and language components for ontology generation Data & Knowledge Engineering 69.4 2010.
(Continued)

*Primary Examiner* — Edwin S Leland, III
(74) *Attorney, Agent, or Firm* — TROUTMAN PEPPER LOCKE LLP; Dustin B. Weeks; Bo Yang

(57) ABSTRACT

Systems and methods for training a machine learning based natural language processor to process specialized language terms. A training corpus of labeled specialized language terms associated with a specialized subject area is assembled. A generated database query corresponding to a question comprising at least one specialized language term within the set of labeled specialized language terms is created with a machine learning based natural language processing process. A cost function is determined based on differences between the generated database query and contents in a knowledge graph mapping terms describing characteristics of entities associated with the specialized subject area. The natural language processing process is refined based on feeding back the cost function to create a refined natural language process. Received queries are processed with the refined natural language process to create database
(Continued)

500 queries directed to answering questions associated with the received query, and the answer is presented.

20 Claims, 7 Drawing Sheets

(51) Int. Cl.
| | |
|---|---|
| *G06N 5/02* | (2023.01) |
| *G06N 5/022* | (2023.01) |
| *G06N 5/04* | (2023.01) |
| *G06N 20/00* | (2019.01) |

(52) U.S. Cl.
CPC ............... *G06N 5/022* (2013.01); *G06N 5/04* (2013.01); *G06N 20/00* (2019.01)

(58) Field of Classification Search
USPC ............................................................ 704/9
See application file for complete search history.

(56) References Cited

U.S. PATENT DOCUMENTS

| | | | | |
|---|---|---|---|---|
| 7,921,091 | B2 * | 4/2011 | Cox | G06N 20/00 |
| | | | | 707/706 |
| 7,962,326 | B2 * | 6/2011 | Tsourikov | G06F 40/30 |
| | | | | 707/706 |
| 8,793,261 | B2 * | 7/2014 | Jiang | G06F 16/3344 |
| | | | | 707/750 |
| 10,332,505 | B2 * | 6/2019 | Zoller | G10L 15/26 |
| 10,515,315 | B2 * | 12/2019 | Karuppasamy | G06N 20/00 |
| 10,764,431 | B1 * | 9/2020 | Pham | H04M 3/5166 |
| 10,867,256 | B2 * | 12/2020 | Bugay | G06N 5/022 |
| 10,984,041 | B2 * | 4/2021 | Bedadala | G06F 40/53 |
| 11,003,851 | B2 * | 5/2021 | Wahl | G06F 40/295 |
| 11,068,477 | B1 * | 7/2021 | Tuckfield | G06F 16/2445 |
| 11,074,250 | B2 * | 7/2021 | Flaks | G06F 16/367 |
| 12,130,847 | B2 * | 10/2024 | Koneru | G06F 9/453 |
| 12,265,792 | B2 * | 4/2025 | Bansal | G06N 5/022 |
| 2015/0331929 | A1 * | 11/2015 | El-Saban | G06F 16/3329 |
| | | | | 707/739 |
| 2016/0041986 | A1 * | 2/2016 | Nguyen | G06Q 50/01 |
| | | | | 707/711 |
| 2018/0052842 | A1 * | 2/2018 | Hewavitharana | |
| | | | | G06F 16/24522 |
| 2018/0068076 | A1 * | 3/2018 | Farri | G16H 70/60 |
| 2018/0210883 | A1 * | 7/2018 | Ang | G06F 40/284 |
| 2019/0042988 | A1 * | 2/2019 | Brown | G06F 16/9535 |
| 2020/0042642 | A1 * | 2/2020 | Bakis | G06F 16/243 |
| 2020/0042649 | A1 * | 2/2020 | Bakis | H04L 51/02 |
| 2020/0057807 | A1 * | 2/2020 | Kapur | G06N 3/045 |
| 2020/0142888 | A1 * | 5/2020 | Alakuijala | G06F 16/242 |
| 2020/0193286 | A1 * | 6/2020 | Byrnes | G06N 3/045 |
| 2020/0210924 | A1 * | 7/2020 | Ghosh | G06N 5/022 |
| 2020/0265325 | A1 * | 8/2020 | Gabaldon Royval | |
| | | | | G06F 16/367 |
| 2020/0301925 | A1 * | 9/2020 | Zhong | G06F 16/24522 |
| 2021/0081717 | A1 * | 3/2021 | Creed | G06N 5/02 |
| 2021/0097096 | A1 * | 4/2021 | Osmon | G06F 40/284 |
| 2021/0271983 | A1 * | 9/2021 | Mohanty | G06F 16/2425 |
| 2021/0294970 | A1 * | 9/2021 | Bender | G06N 5/022 |
| 2022/0051160 | A1 * | 2/2022 | Shadrin | G06N 20/00 |
| 2022/0156466 | A1 * | 5/2022 | Gill | G06N 5/022 |
| 2022/0188661 | A1 * | 6/2022 | Tappin | G06F 16/248 |
| 2022/0308844 | A1 * | 9/2022 | Roisman | G06F 8/427 |
| 2022/0343217 | A1 * | 10/2022 | Mohandoss | G06F 40/40 |
| 2023/0050889 | A1 * | 2/2023 | Kumar Jaya Kumar | |
| | | | | G06F 16/9027 |
| 2023/0229944 | A1 * | 7/2023 | Otieno | G06Q 10/08 |
| | | | | 706/45 |
| 2024/0037128 | A1 * | 2/2024 | Koneru | G06F 16/3329 |
| 2024/0111795 | A1 * | 4/2024 | Ogden | G06N 5/04 |
| 2024/0112105 | A1 * | 4/2024 | Rivera | G06Q 10/063112 |

FOREIGN PATENT DOCUMENTS

| | | | | | |
|---|---|---|---|---|---|
| EP | 0268367 | A2 * | 5/1988 | ........ | G06F 16/2423 |
| WO | WO-2020162943 | A1 * | 8/2020 | .......... | G06Q 10/067 |
| WO | WO-2021107982 | A1 * | 6/2021 | ............ | G06N 3/045 |
| WO | WO-2021132760 | A1 * | 7/2021 | ....... | G06F 16/24542 |

OTHER PUBLICATIONS

Small Design Achievements of the Command Center Information Subsystem (CCIS), A Dynamic and Extensible Computing System for Natural Language Understanding of Navy Command Center Information 1980.

Favre, Contextual language understanding Thoughts on Machine Learning in Natural Language Processing 2019.

Zhong, Seq2sql: Generating structured queries from natural language using reinforcement learning arXiv preprint arXiv:1709. 00103. 2017.

Xu, Sqlnet: Generating structured queries from natural language without reinforcement learning arXiv preprint arXiv:1711.04436 2017.

Yaghmazadeh, et al., SQLizer: Query Synthesis from Natural Language: Proc. ACM Program Lang., vol. 1, No. OOPSLA, Article 63 Publication date Oct. 2017, pp. 63:1 to 63:26.

Li Developing ontologies for engineering information retrieval International Design Engineering Technical Conferences and Computers and Information in Engineering Conference. vol. 48035. 2007. 2007.

Stratica, A natural language processor for querying cindi 2002.

* cited by examiner

<u>100</u>

200

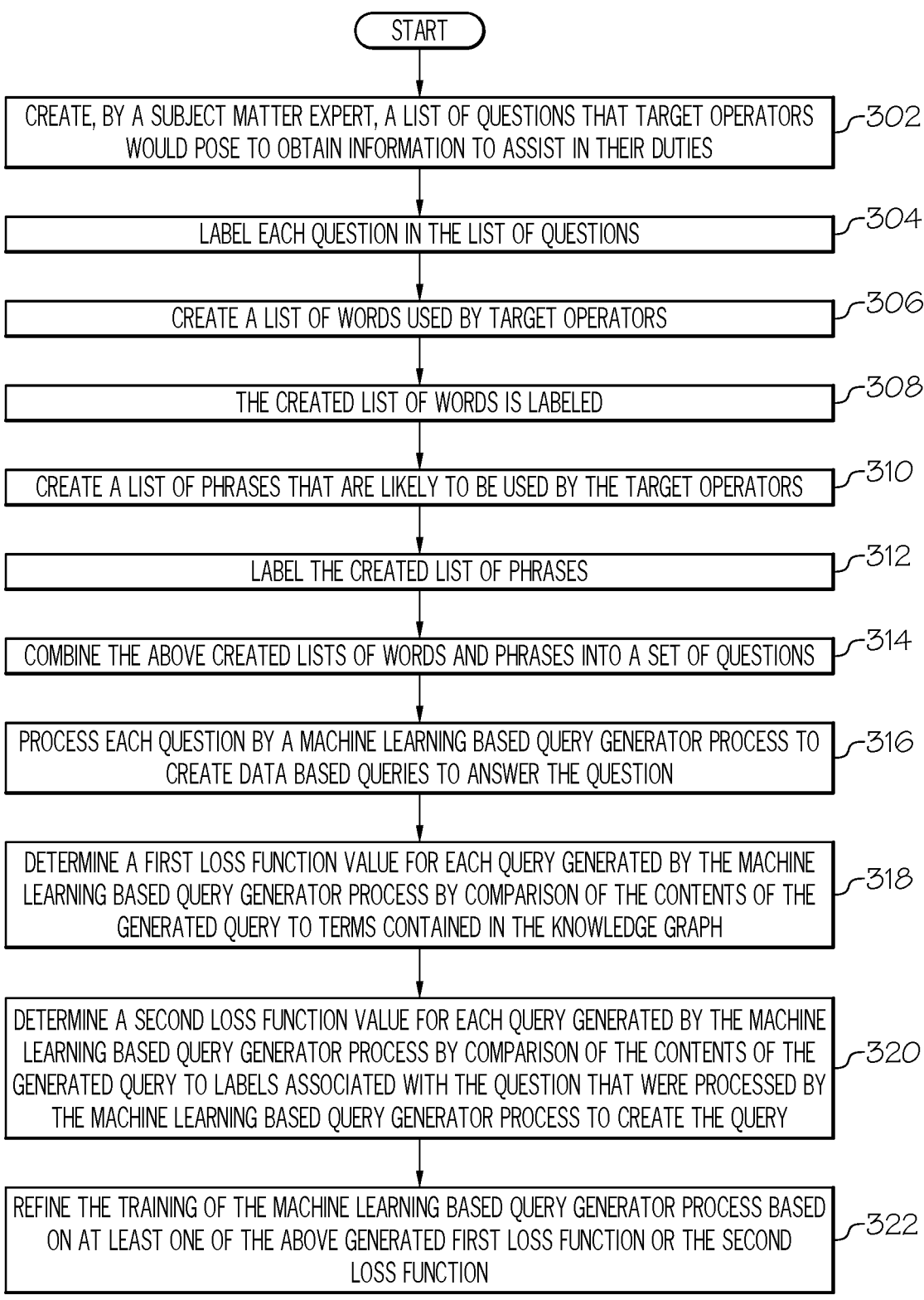

START

CREATE, BY A SUBJECT MATTER EXPERT, A LIST OF QUESTIONS THAT TARGET OPERATORS WOULD POSE TO OBTAIN INFORMATION TO ASSIST IN THEIR DUTIES — 302

LABEL EACH QUESTION IN THE LIST OF QUESTIONS — 304

CREATE A LIST OF WORDS USED BY TARGET OPERATORS — 306

THE CREATED LIST OF WORDS IS LABELED — 308

CREATE A LIST OF PHRASES THAT ARE LIKELY TO BE USED BY THE TARGET OPERATORS — 310

LABEL THE CREATED LIST OF PHRASES — 312

COMBINE THE ABOVE CREATED LISTS OF WORDS AND PHRASES INTO A SET OF QUESTIONS — 314

PROCESS EACH QUESTION BY A MACHINE LEARNING BASED QUERY GENERATOR PROCESS TO CREATE DATA BASED QUERIES TO ANSWER THE QUESTION — 316

DETERMINE A FIRST LOSS FUNCTION VALUE FOR EACH QUERY GENERATED BY THE MACHINE LEARNING BASED QUERY GENERATOR PROCESS BY COMPARISON OF THE CONTENTS OF THE GENERATED QUERY TO TERMS CONTAINED IN THE KNOWLEDGE GRAPH — 318

DETERMINE A SECOND LOSS FUNCTION VALUE FOR EACH QUERY GENERATED BY THE MACHINE LEARNING BASED QUERY GENERATOR PROCESS BY COMPARISON OF THE CONTENTS OF THE GENERATED QUERY TO LABELS ASSOCIATED WITH THE QUESTION THAT WERE PROCESSED BY THE MACHINE LEARNING BASED QUERY GENERATOR PROCESS TO CREATE THE QUERY — 320

REFINE THE TRAINING OF THE MACHINE LEARNING BASED QUERY GENERATOR PROCESS BASED ON AT LEAST ONE OF THE ABOVE GENERATED FIRST LOSS FUNCTION OR THE SECOND LOSS FUNCTION — 322

TRAINING MACHINE LEARNING BASED NATURAL LANGUAGE PROCESSING FOR SPECIALTY JARGON

FIELD OF THE DISCLOSURE

The present disclosure generally relates to systems to train machine learning based models, and more particularly to training machine learning based natural language processes to interpret jargon used by specialists.

BACKGROUND

Natural language processing is used to facilitate many tasks such as by allowing users to express what they want a machine to do without needing special commands that are based on the programming of the machine. Allowing users to express commands or information queries in a natural language format greatly reduces the training required to use a particular machine.

Most natural language processing is configured to support general uses using standard languages. In some examples, specialist personnel, professionals, or others using machines for various purposes use jargon or other specialized words and phrases such as "feedwater position switch" to express various concepts. The use of such different words and phrases that have specialized meanings often limits the effectiveness of conventionally trained machine learning based natural language processing to support such users.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 3 illustrates a machine learning based natural language process training flow, according to an example;

DETAILED DESCRIPTION

Figure 1:
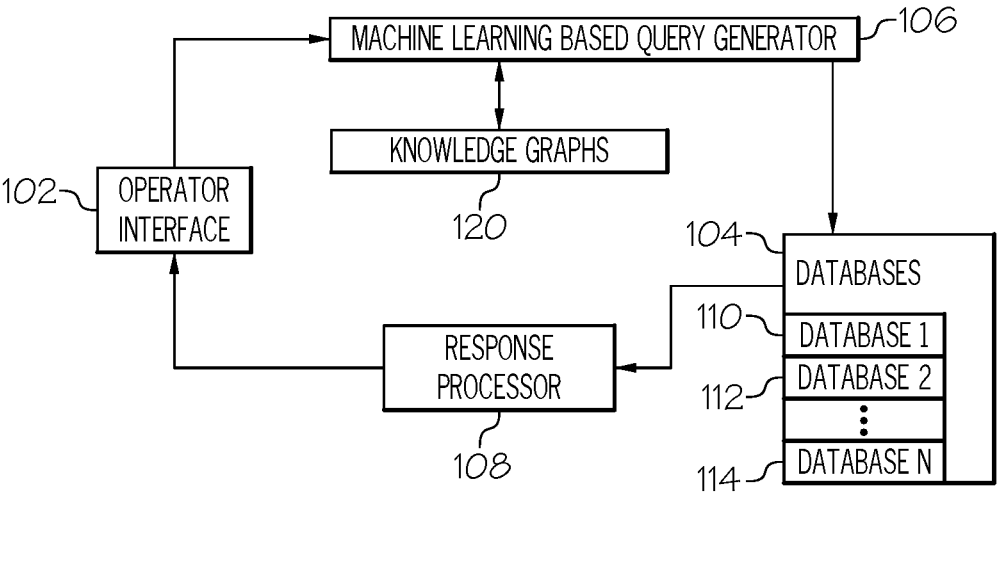
FIG. 1 illustrates a natural language processing system according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods support natural language processing of statements that include specialty jargon or terms, such as are used by persons working in a particular activity. In the following discussion, a reference to "specialized language terms" is a general name for any specialized language used by practitioners in specialized subject areas. Specialized language terms is a broad name and includes, but is not limited to, jargon, specialized terms that have a different meaning in a specialized subject area than in their common meaning in the language at large, other specialized terms, or combinations of these. In an example that is a basis for the following description, a machine learning based natural language processor is used to support operations of an electrical generation plant. One aspect of such a natural language processor is to receive natural language questions that have terms and phrases that include specialized language or jargon used by electrical generation plant operators and then to automatically generate database queries to retrieve the information from proper databases to answer the received natural language questions.

In some examples, a specialized training process is used to efficiently train a machine learning based natural language processor to properly process natural language statements and questions to create database queries to retrieve data from a database or other data storage that is responsive to those statements or questions. The below described systems and methods use a data structure, referred to as a knowledge graph, to define relationships between certain terms and entities, such as equipment, objects, other elements, or combinations of these, that are related to the work of practitioners in specialized subject areas. In some examples, a knowledge graph is used during training of a machine learning to evaluate the quality of database queries that were autonomously generated by processing questions with specialized language terms by a machine learning based natural language processor. In an example the quality of generated database queries is evaluated based on the consistency between the relationships of the terms and entities in the query and the relationships for those terms and entities in the knowledge base. In some examples, evaluation of the quality of the queries is able to also be further based on the data retrieved from one or more databases in response to the queries. These quality evaluations are fed back during the training phase to improve the operation of the natural language processor.

FIG. 1 illustrates a natural language processing system 100 according to an example. The natural language processing system 100 is able to receive natural language questions or statements from an operator, automatically generate database queries to retrieve answers to those questions, and present the responsive answer to the operator. These natural language questions in an example include jargon or specialized words or phrases. The natural language processing system 100 allows an operator to submit questions or statements and receive answers to those questions or responses to the statements that are obtained from one or a number of databases that contain information relevant to that operator. In one example, the natural language processing system 100 supports the operation of an electrical utility's electric generation plant, such as a natural gas or nuclear powered electric generation plant. In such an example, information that is relevant to operators of such plants is able to be stored in a number of databases that contain data in various formats and organizations. Accessing such information using conventional techniques, such as an operator manually forming database queries to obtain desired information, can be a challenge for efficiently obtaining information that is needed or helpful for the operations of such plants.

The natural language processing system 100 includes an operator interface 102. The operator interface 102 in various examples receives questions or statements from operators in any suitable form. In some examples, questions or statements are able to be received as one or more of text input, audio voice input, in other forms, or in any combination of these. These questions or statements are able to contain specific language or jargon for which a natural language processor has been trained to correctly interpret.

The natural language processing system 100 includes databases 104. In an example, databases 104 include a number of databases that contain various different types of information that is relevant to the operator or systems with which the operator is associated. The illustrated databases 104 include a database 1 110, a database 2 112, and a database N 114. Such databases are able to include one or more data storage and retrieval systems of any type or design that operate in one or a number of different locations. Examples of such databases include, but are not limited to, part catalog databases, maintenance history databases, historical workorder databases, other databases or data storage entities, or combinations of these.

The natural language processing system 100 include knowledge graphs storage 120 that is used to store definitions of one or more knowledge graphs. As described in further detail below, knowledge graphs are able to include data that that indicates, for example, relationships between different pieces of equipment and describes characteristics or other data associated with each of the different pieces of equipment. In an example, a knowledge graph is able to identify equipment or other entities with names that may be different than jargon used by operators or others who are using the natural language processing system 100.

The natural language processing system 100 includes a machine learning based query generator 106. The machine learning based query generator 106 in an example receives questions or statements from the operator interface 102 and generates a database query that is submitted to one or more databases to retrieve information related to the received questions or statements. The machine learning based query generator 106 in an example, as is described below, is trained by a specialized process that is configured to efficiently train the machine learning based query generator 106 to properly interpret specialized language or jargon such as would be used by operators of an electrical generation plant.

The natural language processing system 100 further has a response processor 108 that receives responses from the one or more databases in the databases 104 and creates an answer to provide to the operator. In an example, the answer is provided to the operator interface 102 for presentation to the operator.

Figure 2:
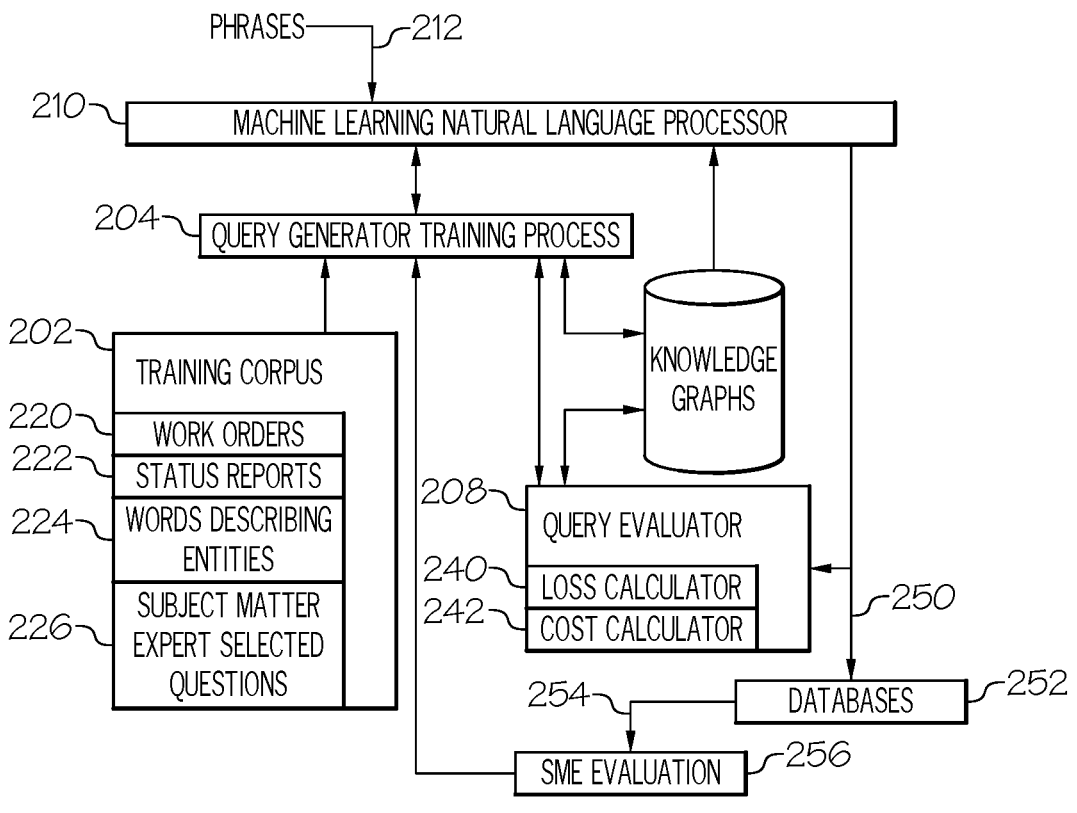
FIG. 2 illustrates a machine learning based natural language processing query generator training system, according to an example.

FIG. 2 illustrates a machine learning based natural language processing query generator training system 200, according to an example. The machine learning based natural language processing query generator training system 200 implements a specialized process to efficiently train a machine learning based natural language processing query generator to autonomously generate database queries to respond to received questions or statements that contain specialized language or jargon used by practitioners in one or more specialized areas, such as operators of electrical generation plants. The machine learning based natural language processing query generator training system 200 in an example is auxiliary to or part of the above-described machine learning based query generator 106 and operates to train the natural language recognition processing implemented by the machine learning based query generator 106.

The machine learning based natural language processing query generator training system 200 includes a training corpus 202. The training corpus 202 in an example includes a number of entries, such as questions, sentences, phrases, other data, or combinations of these, that include specialized language or jargon that is used by practitioners in a particular field. In an example, the training corpus 202 contains entries that include elements such as words that refer to entities, a list of intents for questions used to ask about entities, a set of work orders for a system where the work orders use specialized language or jargon, other elements, or combinations of these. In some examples, one or more subject matter experts select, annotate, label, create, otherwise prepare, or perform combinations of these, for at least some of the entries of the training corpus 202. The subject matter expert in an example selects, creates, or otherwise prepares entries that include particular phrases, sentences, or other content that corresponds to questions that the target operators might have.

The entries in the training corpus 202 are also able to include terminologies, jargon, special words or language, special phrases, or other language elements that the target operators would use in the course of their work. The subject matter experts in an example also label one or more entries, and in some examples label all entries, with an indication of the ground truth of what the phrase, sentence, or other element in the training corpus refers to. In some examples, a subject matter expert is also able to label each entry with a database query that can be used to answer the question, indications of terms or other elements to be included into a corresponding database query, or both. In some examples, the subject matter expert provides labels for one or more entries that indicate one or more databases to query for information related to the entry, terms or other elements to include in a created database query, other components of one or more database queries that are related to the particular element of the training corpus, or combinations of these.

The machine learning based natural language processing query generator training system 200 includes a machine learning natural language processor 210 that autonomously processes received natural language phrases to derive the intent of and identify entities specified in the received phrases. The machine learning natural language processor 210 in an example is part of the above-described machine learning based query generator 162 and, in an example, operates to create queries based upon received questions, sentences, phrases, other inputs, or combinations of these. In various examples, the machine learning based natural language processor 210 is able to receive phrases 212 from external sources such as the above-described operator interface 102, or from a natural language processing query generator training process 204.

The machine learning based natural language processing query generator training system 200 also includes a natural language processing query generator training process 204 that operates to train the machine learning based natural language processing performed by the machine learning based natural language processor 210. In the context of the machine learning based natural language processing query generator training system 200, the natural language processing query generator training process 204 operates to perform machine learning based training of the natural language processing algorithms in the machine learning based natural language processor 210 by providing phrases, sentences, questions, other data, or combinations of these, that are contained in the training corpus 202, along with labeling information or other data, to the machine learning based natural language processor 210.

The machine learning natural language processor 210 in an example includes processing of received phrases from the training corpus to determine intents expressed in those phrases and also names of equipment or other entities that are expressed in those phrases. Based on these determined intents and identified entities, a respective database query 250 is generated that is directed to retrieving information from one or more databases 252 that responds to each phrase, sentence or question that is received from the query generator training process 204 based on entries in the training corpus 202, or that is received as phrases 212, such as from an operator interface 102. As is described below, these queries 250 are able to be provided to a query evaluator 208 to evaluate queries 250 generated by the machine learning based natural language processor 210, including queries generated based on unlabeled phrases.

Queries produced by the machine learning based natural language processor 210 are provided to a query evaluator 208. The query evaluator 208 in an example includes a loss function calculator 242 to determine the difference between the queries produced by the query generator training process 204 and valid queries that are to be submitted to databases 104. In an example, the query evaluator evaluates queries based on labels for the corresponding question or other input as is provided by the query generator training process 204. In an example, the loss function determined by the query evaluator is able to be calculated based on determining whether the generated queries contain valid query terms that are all related to one another as is indicated by the data in the knowledge base 206. In an example, the knowledge base 206 is similar to the knowledge base 120 depicted above and described in further detail below. The query evaluator 208 in an example also includes a cost function evaluator that determines cost function values for a set of generated queries that are produced based on a number of training corpus entities.

The machine learning based natural language processing query generator training system 200 in an example is able to evaluate queries generated by the machine learning based natural language processor 210 where those queries were generated in response to receiving an unlabeled phrase. A query generated in response to an unlabeled phrase is able to be evaluated by the query evaluator 208 determining if the generated query contains valid query terms as are contained in the knowledge base 206. The generated queries are also able to be evaluated based upon comparisons to the intents of the phrases that are determined by the query generator training process 204 for the received phrase from which the generated query was determined.

The query evaluator 208 provides evaluations of the queries back to the query generator training process 204. The evaluations, such as determined loss functions, cost functions, other evaluations, or combinations of these, are used to update the machine learning based natural language processor definition 210. In an example, iterations of the above are performed to refine the definition of the machine learning based natural language processing definition 210.

In an example, the generated queries 250 are submitted to one or more databases 252. The results 254 of those queries are evaluated by an SME evaluation 256. The SME evaluation 256 is able to be performed via an operator interface 102. The results of the SME evaluation are provided back to the query generator training process 204 to support further training of the machine leaning natural language processor 210.

FIG. 3 illustrates a machine learning based natural language process training flow 300, according to an example. The machine learning based natural language process training flow 300 is an example of a process performed by the above-described machine learning based natural language processing query generator training system 200. The following examples describe a particular example used to efficiently train a natural language processing process to interpret statements made by operators of an electrical power generation plant. In the following discussion, the term target operators refer to users who use the specialized language or jargon for which the natural language process is trained to interpret. In general, a similar process is able to be used to efficiently train a natural language processing process for any specialized language or jargon.

The machine learning based natural language process training flow 300 in an example includes a subject matter expert creating, at 302, a list of questions that target operators would pose to obtain information to assist in their duties. Such a list is able to be created by any suitable technique, including selecting questions, sentences, phrases, other fragments, or combinations of these, from prior work orders, problem reports, reports of any nature, other business records, or combinations of these.

Each question in the list of questions is labeled, at 304. In some examples, labeling of the list of questions is able to include one or more of labels that indicate aspects such as an intent of the question or phrase, a meaning of each question or phrase, other aspects, or combinations of these. In some examples, the labels can indicate terms in the knowledge graph 206 that correspond to the question, or combination of these.

A list of words used by target operators is created in an example, at 306. In an example, the list of words includes specialized words, jargon, or both, that refer to entities, such as equipment, systems, locations, other entities, actions, tasks, or combination of these, that are associated with the target operator's responsibilities.

The created list of words is labeled, at 308. Labeling is able to include one or more of a more common or widely understood meaning of each word, one or more words that are in the knowledge graph 206, other information, or combination of these.

A list of phrases that are likely to be used by the target operators is created, at 310. The list of phrases in some examples are able to be at least partially assembled from, for example, a collection of past work order descriptions for equipment or other repairs performed on things associated with the target operator's responsibilities. In general, a list of phrases provides additional information regarding the context in which a word or words are used in jargon used by target operators.

The created list of phrases is labeled, at 312. Labeling is able to include one or more of more common or widely understood meanings associated with each phrase, one or more words that are in the knowledge graph 206, intents that are associated with the phrase, context that is associated with the phrase, other information regarding the phrase, or combination of these.

The above created lists of words and phrases are combined, at 314, into a set of questions. In some examples, each question is also associated with the labels that were assigned to the words and phrases that were combined into that question. In further examples, one or more of these questions are able to be assigned labels, other information, or combinations of these, that are able to support training of a machine learning based natural language processing system such as the above described machine learning natural language processor 210.

Each question is processed, at 316, by a machine learning based query generator process to create database queries to answer the question. In an example, the processed questions include questions in the list of questions created above, at 302, and also the questions created, at 314, by combining phrases and words. With reference to the machine learning based natural language processing query generator training system 200 discussed above, the natural language processing query generator training process 204 processes the generated questions and produces queries to submit to databases to answer those questions.

A first loss function value is determined, at 318, for each query generated by the machine learning based query generator process by comparison of the contents of the generated query to terms contained in the knowledge graph 206.

A second loss function value is determined, at 320, for each query generated by the machine learning based query generator process by comparison of the contents of the generated query to labels associated with the question that were processed by the machine learning based query generator process to create the query.

As is known to practitioners of ordinary skill in the relevant arts, a loss function value for the output of a machine learning based process represents an estimated difference between the output of that process and its desired value. Values for a cost function can be determined by combining determined values of loss functions for a number of queries. In this example, values of a determined cost function are used as feedback for training and refinement of the machine learning based query generator process that generated the queries.

The training of the machine learning based query generator process is refined, at 322, based on at least one of the above generated first loss function or the second loss function. Refinement of the machine learning based query generator process in an example includes adjustments of parameters of the machine learning based natural language processor 210 by any suitable process. The machine learning based natural language process training flow 300 then ends.

Figure 4:
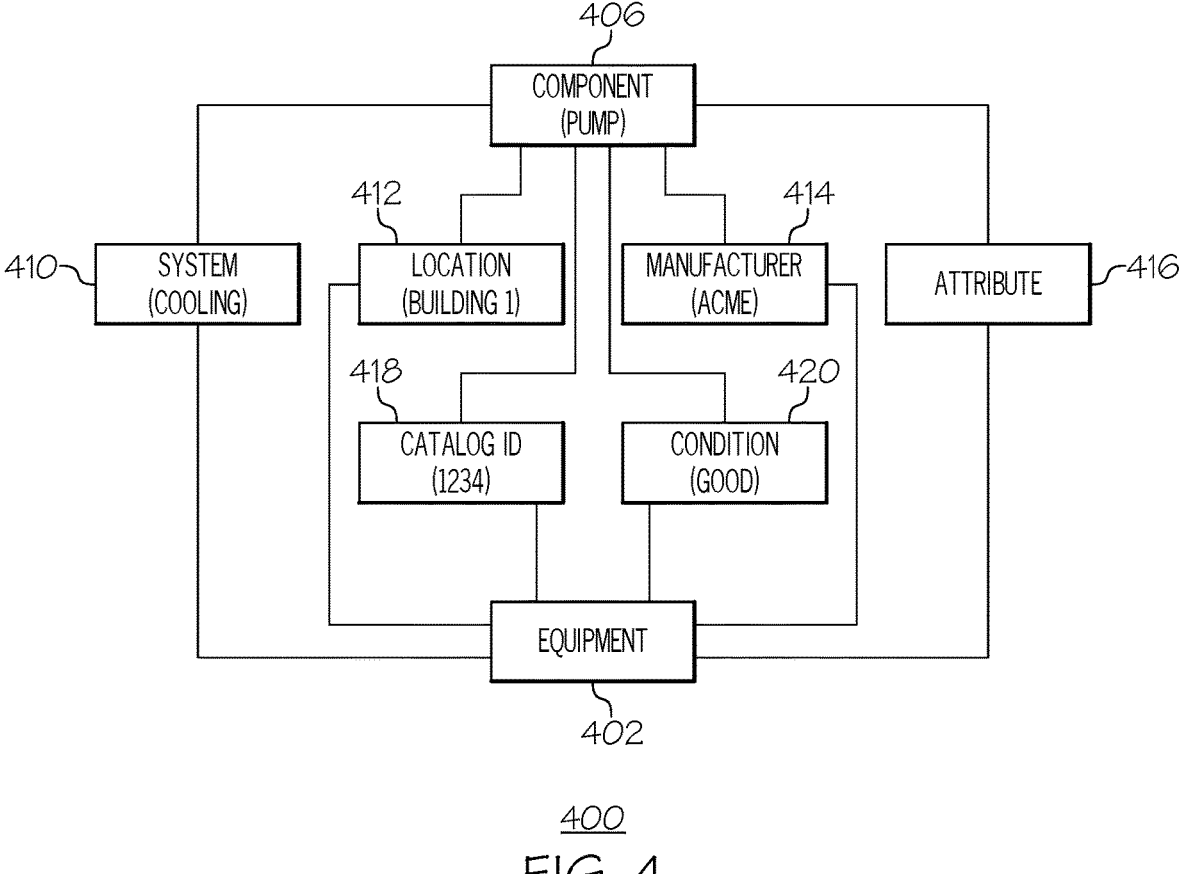
FIG. 4 illustrates a knowledge graph, according to an example.

FIG. 4 illustrates a knowledge graph 400, according to an example. In an example, a knowledge graph assembles data in one data structure that indicates, for example, relationships between different pieces of equipment and describes characteristics or other data associated with each of the different pieces of equipment.

The illustrated knowledge graph 400 includes a component node 406 that includes information to indicate the component for which the knowledge graph 400 contains information. The component 406 in this example is a pump.

The example knowledge graph 400 includes a system node 410 that includes an indication of the system of which the component 406 is a part. The illustrated system node 410 indicates that this component is part of the cooling system.

The example knowledge graph 400 includes a location node 412 that includes an indication of the location of the component 406. The illustrated location node 412 indicates that the component 406 is in building 1.

The example knowledge graph 400 includes a manufacturer node 414 that includes an indication of the manufacturer of the component 406. The illustrated manufacturer node 414 indicates ACME.

The example knowledge graph 400 depicts an attribute node 416 that includes data indicating an attribute of the component 406. In general, a knowledge graph 400 is able to have any number of attribute nodes that each include information about different attributes of the component 406.

The example knowledge graph 400 includes a catalog ID node 418 that includes an indication of part identification data in a catalog for the component 406. In an example the catalog ID node 418 includes a part number or other identifying information that can be combined with data in the manufacturer node 414, the attribute node 416, other nodes, or combinations of these. The illustrated catalog ID node 418 indicates 1234.

The example knowledge graph 400 includes a condition report node 420 that includes an indication of observed conditions of the component 406. The illustrated condition report node 420 indicates Good.

The example knowledge graph 400 includes an equipment node 402 that includes indications of equipment contained within the component 406.

Figure 5:
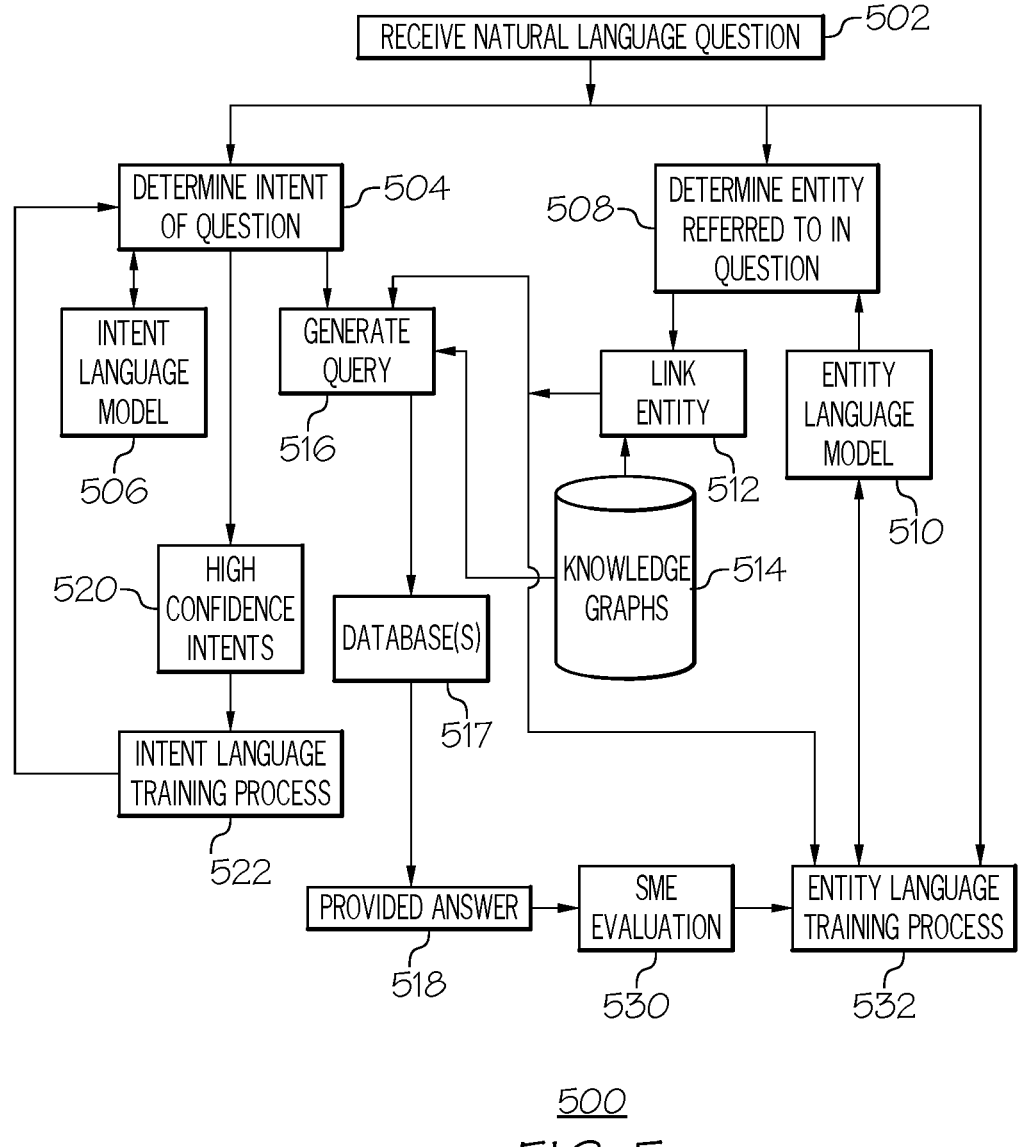
FIG. 5 illustrates an autonomous query generation process, according to an example.

FIG. 5 illustrates an autonomous query generation process 500, according to an example. The autonomous query generation process 500 is an example of a process that is performed by the machine learning based query generator 106 and that is also performed by the natural language processing query generator training process 204 that is used to train the machine learning natural language processor definition 210.

The autonomous query generation process 500 receives, at 502, a natural language question. In an example, the question uses specialized language or jargon used to by a target operator. This question is an example of the above-described phrase that is used as a basis for generating a database query.

The received question is processed to determine two aspects of the received question in the illustrated autonomous query generation process 500. The received question is processed to determine intent of the question, at 504, and to detect, at 508, entities contained within the received question. The processing to determine these two aspects is performed in parallel in an example with processing performed at least in part by specialized processing as is described below. Answers produced by database queries generated in response to the received questions in an example are able to be further evaluated by a subject matter expert with that ranking compared to evaluations and rankings determined by autonomous evaluators.

The intent of the question is determined in an example based on a language model 506 that is a machine learning based natural language processing model that has been trained to interpret the specialized language or jargon used by the target operator in order to determine the intent of a question. Examples of intent of a question include, but are not limited to, inquiring what something is made of, what something is a component of, which manufacturer made an item, other intents of questions, or combinations of these.

In an example, the autonomous query generation process 500 is able operate to refine the training of the machine learning based natural language processing model to determine intents of a question. In an example, determining the intent of a question, at 504, produces a ranked list of candidate intents with each candidate intent having a confidence ranking. Confidence rankings in an example are assigned by a machine learning based natural language processor to indicate the level of confidence the processor assigns to the particular output, as is known by practitioners of ordinary skill in the relevant arts. The highest confident intents 520 in an example are provided to an intent language model training process 522. The intent language model training process 522 combines these highest confident intents with the received natural language question to provide new question-label pairs that are able to be used as part of an augmented training corpus to further train the intent language model 506.

The question is also processed in an example to detect, at 508, entities contained within the received question. Examples of such entities include components within a system, such as a "feedwater position switch." The entities contained in the question are determined in an example based on an entity language model 510 that is a machine learning based natural language processing model that has been trained to interpret the specialized language or jargon used by the target operator in order to determine entities mentioned in the question.

Once an entity is identified in the received question, the entity is linked, at 512, to a specific name for the entity. Entity linking in an example is based on the contents of a knowledge graph 514. In an example, the specific name for the entity is able to be any suitable identifier, such as a catalog number, part number, other value, or combinations of these.

The determined intent and the linked entity identifier are provided to a query generation process 516. In an example, the query generation process uses data in the knowledge graph 514 to create a database query to extract information from one or more databases to answer the question. The generated query is submitted to the proper one or more databases 517 and an answer 518 is then provided.

In an example, the provided answer includes a number of answers that are presented to a Subject Matter Expert (SME) for SME evaluation 530. The SME will select a best answer that best fits the received natural language question as received at 502. The entities identified at 512, which is supported by the use of the knowledge graphs 514, for the received natural language question may differ from the entities identified by the entity language model 510 for that received natural language question. In such a condition, the entities identified at 512 are then used to label the received natural language question to produce an additional labeled natural language question that is able to be used as part of the training corpus for the entity language model 510. In an example, the received question and selected answer are provided to an entity training process 532. The entity training process 532 obtains the entities identified for the received question from the link entity 512 to create the additional labeled natural language question and uses that data to further train the entity language model 510.

In an example, subject matter experts (SMEs) rank the provided answers, at 530, either explicitly or implicitly. Each provided answer corresponds to a generated query, at 516. The generated query corresponds to one or more relationships in the knowledge graph 514. Hence, the rankings provided by subject matter experts (SMEs) are used to assign weights to the relationships in the knowledge graph. For each received natural language question and generated query, the difference between the relationship weights for each term in the knowledge graph 514 as determined by the SME rankings relative to the probability of the relationships in the generated query as determined by the entity language model 510 when generating that query is used as the loss function to update both the intent engine language model 506 and entity language model 510.

Figure 6:
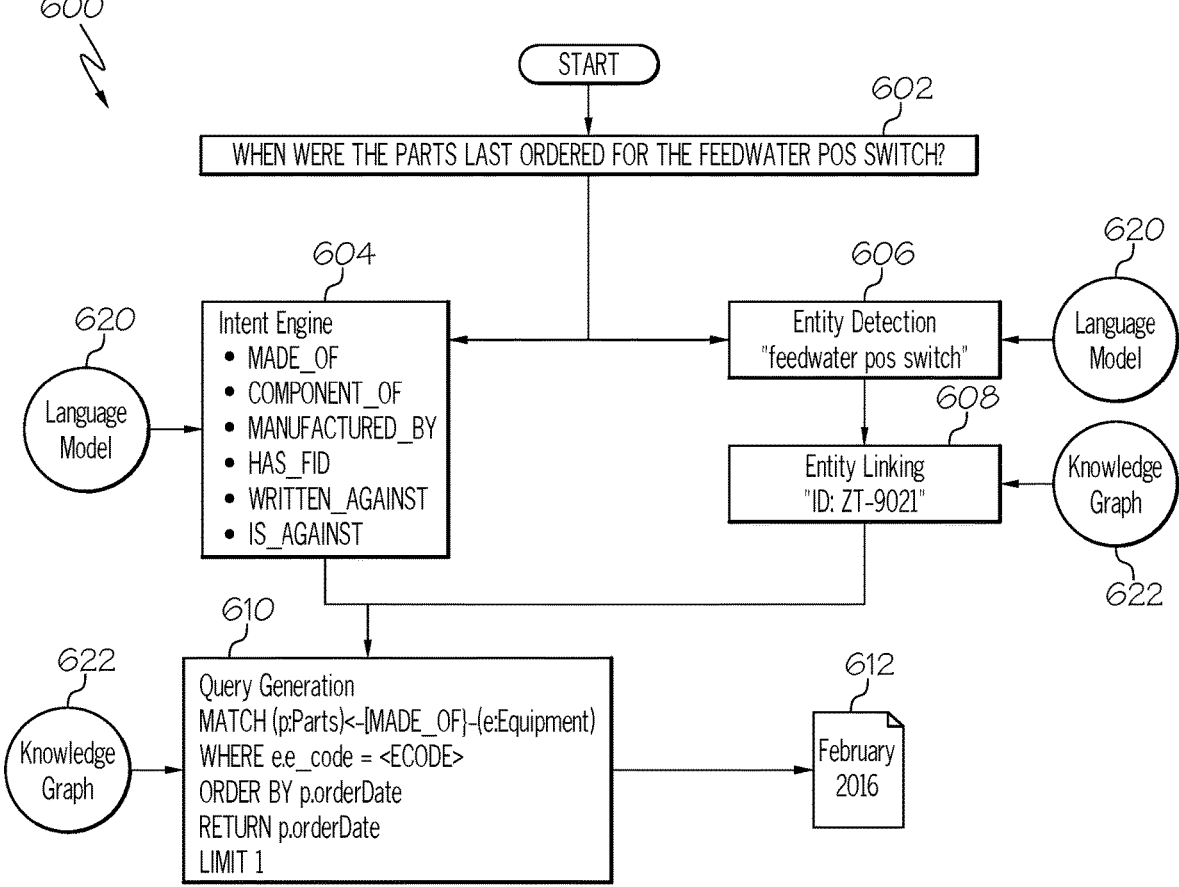
FIG. 6 illustrates an autonomous query generation example, according to an example.

FIG. 6 illustrates an autonomous query generation example 600, according to an example. The autonomous query generation example 600 is an example of processing by the above-described autonomous query generation process 500 of a received natural language query that includes "jargon." In this illustrated example, the received natural language query is "When were the parts last ordered for the feedwater pos switch?" The below description refers to the processing described for the autonomous query generation process 500.

The autonomous query generation example 600 shows the received question 602 as "When were the parts last ordered for the feedwater pos switch?" The received question 602 in an example is a natural language question as is received at "receive natural language question" 502.

The received natural language question 602 is by an intent engine 604 and entity detection 606. The intent engine 604 and entity detection 606 both utilize a language model 620 to perform their processing. The language model 620 in an example is a machine learning based natural language processing model and includes the above-described intent language model 506 and entity language model 510.

The intent engine 604 performs the "determine intent of question" 504 and in this example of the question "When were the parts last ordered for the feedwater pos switch?" identifies the following intents as candidate items of information that the person posing the question wants in an answer to that question:

MADE_OF
COMPONENT_OF
MANUFACTURED_BY
HAS_FID
WRITTEN_AGAINST
IS_AGAINST

The entity detection 606 in this example determines the entity referred to in the question "When were the parts last ordered for the feedwater pos switch?" is "feedwater pos switch." In an example, determination of this entity is based on training of the language model 620 with similar questions.

Entity linking 608 determines the linked entity is "ID: ZT-9021." In an example, this linking is based on information in the Knowledge graph 622, which correspond to the knowledge graphs 514 discussed above.

The intent determined by the intent engine 604 and the linked entity 608 are provided to a query generation module 610, which performs the above described generate query 516. For the example question of "when were the parts last ordered for the feedwater pos switch?", the query generation 610 creates a database query of:

```
MATCH (p:Parts)←[:MADE_OF]-(e:Equiment)
WHERE e.e_code=<ECODE>
```

ORDER BY p.orderDate DESC
RETURN p.orderDate
LIMIT 1

The database query generated by the query generation module 610 is then submitted one or more databases 517 to obtain a provided answer 518. In the example of the question "When were the parts last ordered for the feedwater pos switch?", the response 612 provided to the generated database query in this case is "February 2016."

Figure 7:
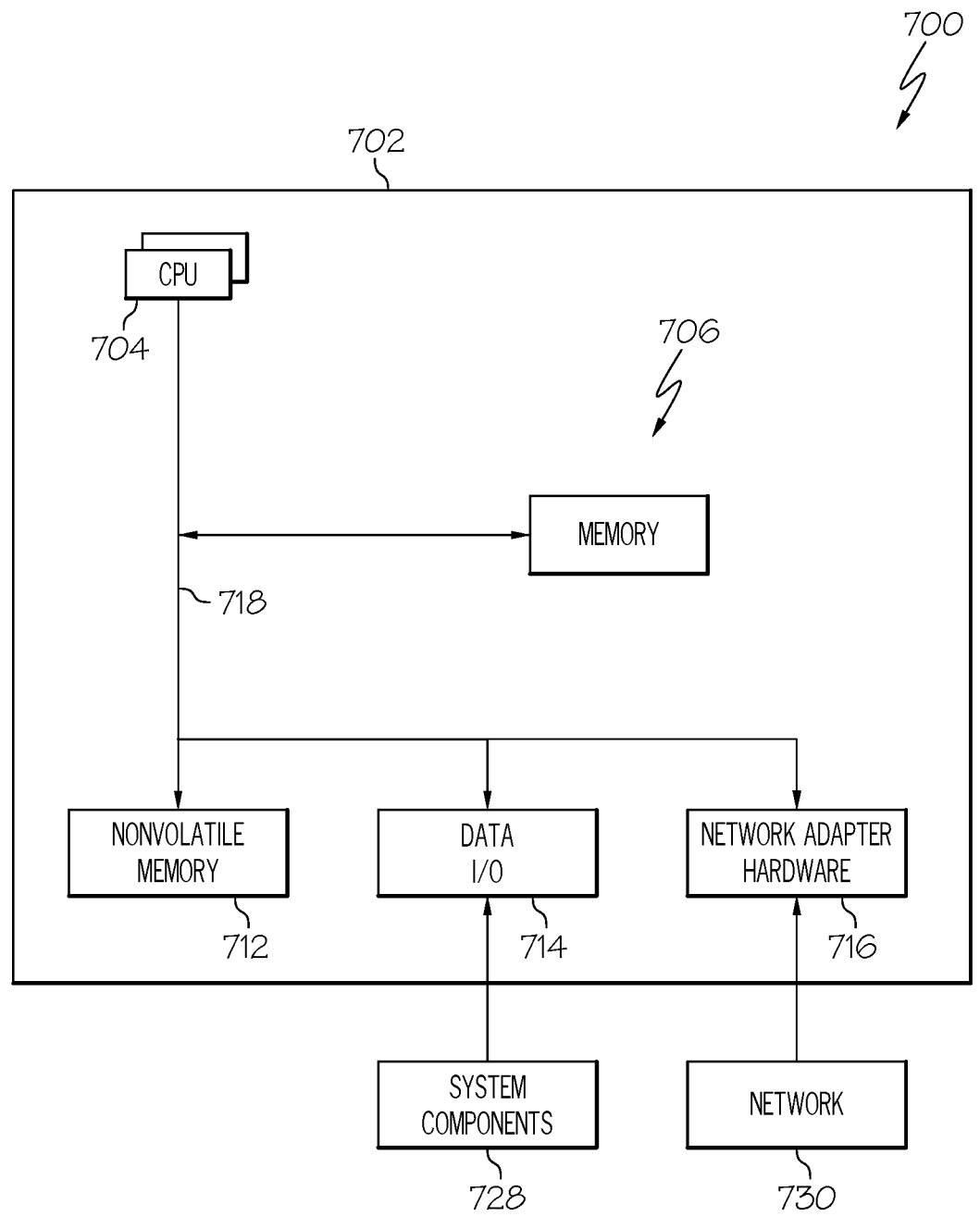
FIG. 7 illustrates a block diagram illustrating a processor, according to an example.

FIG. 7 illustrates a block diagram illustrating a processor 700 according to an example. The processor 700 is an example of a processing subsystem that is able to perform any of the above-described processing operations, control operations, other operations, or combinations of these.

The processor 700 in this example includes a CPU 704 that is communicatively connected to a main memory 706 (e.g., volatile memory), a non-volatile memory 712 to support processing operations. The CPU is further communicatively coupled to a network adapter hardware 716 to support input and output communications with external computing systems such as through the illustrated network 730.

The processor 700 further includes a data input/output (I/O) processor 714 that is able to be adapted to communicate with any type of equipment, such as the illustrated system components 728. The data input/output (I/O) processor in various examples is able to be configured to support any type of data communications connections including present day analog and/or digital techniques or via a future communications mechanism. A system bus 718 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above-described methods and realize the above-described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of training a machine learning based natural language processing process to process specialized language terms, the method comprising:

assembling a training corpus of natural language terms comprising a set of labeled specialized language terms associated with a specialized subject area;

generating, with the machine learning based natural language processing process, a database query corresponding to a question comprising at least one specialized language term within the set of labeled specialized language terms;

determining a cost function value based on one or more differences between the generated database query and contents in a knowledge graph, the knowledge graph mapping terms associated with the set of labeled specialized language terms to corresponding entities associated with one or more elements in the specialized subject area, the terms comprising at least one term different from one term within the set of labeled specialized language terms;

refining the machine learning based natural language processing process based on feeding back the cost function value;

processing received one or more queries with the refined machine learning based natural language processing process to create one or more database queries directed to answering one or more questions associated with the received one or more queries; and presenting the answer.

2. The method of claim 1, wherein the training corpus comprises the question, and the method further comprising identifying an entity in the question based on the contents in the knowledge graph.

3. The method of claim 1, wherein the training corpus comprises the question, and the method further comprising identifying an intent in the question based on the contents in the knowledge graph.

4. The method of claim 1, wherein:

the training corpus comprises a plurality of questions, the method further comprises generating, with the machine learning based natural language processing process, a respective generated database query, and

determining the cost function value comprises determining a respective loss function value for each respective generated database query based on the contents in the knowledge graph.

5. The method of claim 1, wherein assembling the training corpus comprises labeling, by a subject matter expert, data in the training corpus to create the set of labeled specialized language terms.

6. The method of claim 1, wherein the training corpus further comprises maintenance records.

7. The method of claim 6, wherein the maintenance records comprise work orders.

8. The method of claim 1, wherein determining the cost function value comprises determining a loss function value by comparing content of the generated database query to the terms in the knowledge graph, wherein the specialized language terms have a different meaning in the specialized subject area than in their common meaning in natural language.

9. The method of claim 1, wherein the specialized subject area is an electric generation plant.

10. A machine learning based natural language processor processing process training system, comprising:

a processor;

a memory communicatively coupled to the processor, the memory storing instructions causing the processor to:

assemble a training corpus of natural language terms comprising a set of labeled specialized language terms associated with a specialized subject area;

generate, with a machine learning based natural language processing process, a database query corresponding to a question comprising at least one specialized language term within the set of labeled specialized language terms;

determine a cost function value based on one or more differences between the generated database query and contents in a knowledge graph, the knowledge graph mapping terms associated with the set of labeled specialized language terms to corresponding entities associated with one or more elements in the specialized subject area, the terms comprising at least one term different from one term within the set of labeled specialized language terms;

refine the machine learning based natural language processing process based on feeding back the cost function value;

process received one or more queries with the refined machine learning based natural language processing process to create one or more database queries directed to answering one or more questions associated with the received one or more queries; and present the answer.

11. The machine learning based natural language processing process training system of claim 10, wherein the training corpus comprises the question, and the processor is further caused to identify an entity in the question based on the contents in within the knowledge graph.

12. The machine learning based natural language processing process training system of claim 10, wherein the training corpus comprises the question, and the processor is further caused to identify an intent in the question based on the contents in the knowledge graph.

13. The machine learning based natural language processing process training system of claim 10, wherein:

the training corpus comprises a plurality of questions,

the processor is further caused to generate, with the machine learning based natural language processing process, a respective generated database query, and determine the cost function value comprises determine a respective loss function value for each respective generated database query based on the contents in the knowledge graph.

14. The machine learning based natural language processing process training system of claim 10, wherein assemble the training corpus comprises label, by a subject matter expert, data in the training corpus to create the set of labeled specialized language terms.

15. The machine learning based natural language processing process training system of claim 10, wherein the training corpus further comprises maintenance records.

16. The machine learning based natural language processing process training system of claim 15, wherein the maintenance records comprise work orders.

17. The machine learning based natural language processing process training system of claim 10, wherein determine the cost function value comprises determining a loss function value by comparing content of the generated database query to the terms in the knowledge graph, wherein the specialized language terms have a different meaning in the specialized subject area than in their common meaning in natural language.

18. The machine learning based natural language processing process training system of claim 10, wherein the specialized subject area is an electric generation plant.

19. A non-transitory computer medium having stored thereon instructions for training a machine learning based natural language processing process to process specialized language terms, the instructions comprising computer readable program code which when executed by one or more processors, cause the one or more processors to:

assemble a training corpus of natural language terms comprising a set of labeled specialized language terms associated with a specialized subject area;

generate, with the machine learning based natural language processing process, a database query corresponding to a question comprising at least one specialized language term within the set of labeled specialized language terms;

determine a cost function value based on one or more differences between the generated database query and contents in a knowledge graph, the knowledge graph mapping terms associated with the set of labeled specialized language terms to corresponding entities associated with one or more elements in the specialized subject area, the terms comprising at least one term different from one term within the set of labeled specialized language terms;

refine the machine learning based natural language processing process based on feeding back the cost function value;

process received one or more queries with the refined machine learning based natural language processing process to create one or more database queries directed to answering one or more questions associated with the received one or more queries; and present the answer.

20. The non-transitory computer medium of claim 19, wherein determine the cost function value comprises determining a loss function value by comparing content of the generated database query to the terms in the knowledge graph, wherein the specialized language terms have a different meaning in the specialized subject area than in their common meaning in natural language.

\* \* \* \* \*